United States Patent
Feindler et al.

(10) Patent No.: US 11,346,337 B2
(45) Date of Patent: May 31, 2022

(54) PROPORTIONAL SPOOL VALVE FOR ADJUSTING THE DISPLACED VOLUME OF A DISPLACEMENT PUMP, ASSEMBLY METHOD AND SYSTEM

(71) Applicant: ETO Magnetic GmbH, Stockach (DE)

(72) Inventors: Michael Feindler, Stockach (DE); Marcin Nieweglowski, Wroclaw (PL)

(73) Assignee: ETO Magnetic GmbH, Stockach (DE)

( * ) Notice: Subject to any disclaimer, the term of this patent is extended or adjusted under 35 U.S.C. 154(b) by 185 days.

(21) Appl. No.: 16/607,926

(22) PCT Filed: Apr. 19, 2018

(86) PCT No.: PCT/EP2018/060019
§ 371 (c)(1),
(2) Date: Oct. 24, 2019

(87) PCT Pub. No.: WO2018/197327
PCT Pub. Date: Nov. 1, 2018

(65) Prior Publication Data
US 2021/0033087 A1 Feb. 4, 2021

(30) Foreign Application Priority Data
Apr. 27, 2017 (DE) ...................... 10 2017 109 061.4

(51) Int. Cl.
*F16K 11/07* (2006.01)
*F16K 27/10* (2006.01)
(Continued)

(52) U.S. Cl.
CPC ............. *F04B 53/108* (2013.01); *F01M 1/16* (2013.01); *F04B 49/225* (2013.01); *F16K 11/07* (2013.01);
(Continued)

(58) Field of Classification Search
CPC .... F16K 11/07; F16K 11/0712; F16K 27/041; F16K 27/048; F16K 27/10; F16K 27/102; F16K 31/0613
See application file for complete search history.

(56) References Cited

U.S. PATENT DOCUMENTS 5,551,482 A * 9/1996 Dixon ................. F15B 13/0402
137/625.65
6,126,420 A   10/2000 Eisenmann
(Continued)

FOREIGN PATENT DOCUMENTS

DE    10334684 A1    2/2004
DE    10259107 A1    7/2004
(Continued)

OTHER PUBLICATIONS

International search report for patent application No. PCT/EP2018/060019 dated Jul. 16, 2018.

*Primary Examiner* — Matthew W Jellett
(74) *Attorney, Agent, or Firm* — Bachman and Lapointe PC; George Coury

(57) ABSTRACT

A proportional spool valve (1) for adjusting a displaced volume of a displacement pump, in particular of an oil pump in a motor vehicle, the proportional spool valve (1) includes a valve housing (2) and a valve spool (3) which is mounted in the valve housing (2) and displaceable along a displacement axis (V) and which can be displaced against the spring force of a valve spring (6) axially supported on a spring holder (7) which is fixed relative to the valve housing (2) by energizing an electrical coil assembly (10), characterized in that wherein both the preferably single-piece spring holder (7) and the valve housing (2) are made of plastic and that the spring holder (7) is welded to the valve housing (2), an integral welded connection (9) being formed.

19 Claims, 3 Drawing Sheets

(51) Int. Cl.
  *F04B 53/10*   (2006.01)
  *F01M 1/16*   (2006.01)
  *F04B 49/22*   (2006.01)
  *F16K 27/04*   (2006.01)
  *F16K 31/06*   (2006.01)
  *F01M 1/02*   (2006.01)

(52) U.S. Cl.
  CPC ............ *F16K 27/048* (2013.01); *F16K 27/10* (2013.01); *F16K 27/102* (2013.01); *F16K 31/0613* (2013.01); *F01M 2001/0246* (2013.01); *F16K 11/0712* (2013.01)

(56) References Cited

U.S. PATENT DOCUMENTS

| | | | |
|---|---|---|---|
| 6,701,959 B1 | 3/2004 | Flynn et al. | |
| 9,657,651 B2 * | 5/2017 | Korn | F02D 9/107 |
| 2009/0107451 A1 * | 4/2009 | Bochart | F01M 1/16 |
| | | | 123/196 R |
| 2011/0147630 A1 | 6/2011 | Nisinosono et al. | |
| 2014/0261716 A1 | 9/2014 | Van Weelden et al. | |

FOREIGN PATENT DOCUMENTS

| | | |
|---|---|---|
| DE | 102007033146 A1 | 1/2009 |
| DE | 102010025171 A1 | 12/2011 |
| DE | 102014012306 A1 | 2/2016 |

* cited by examiner

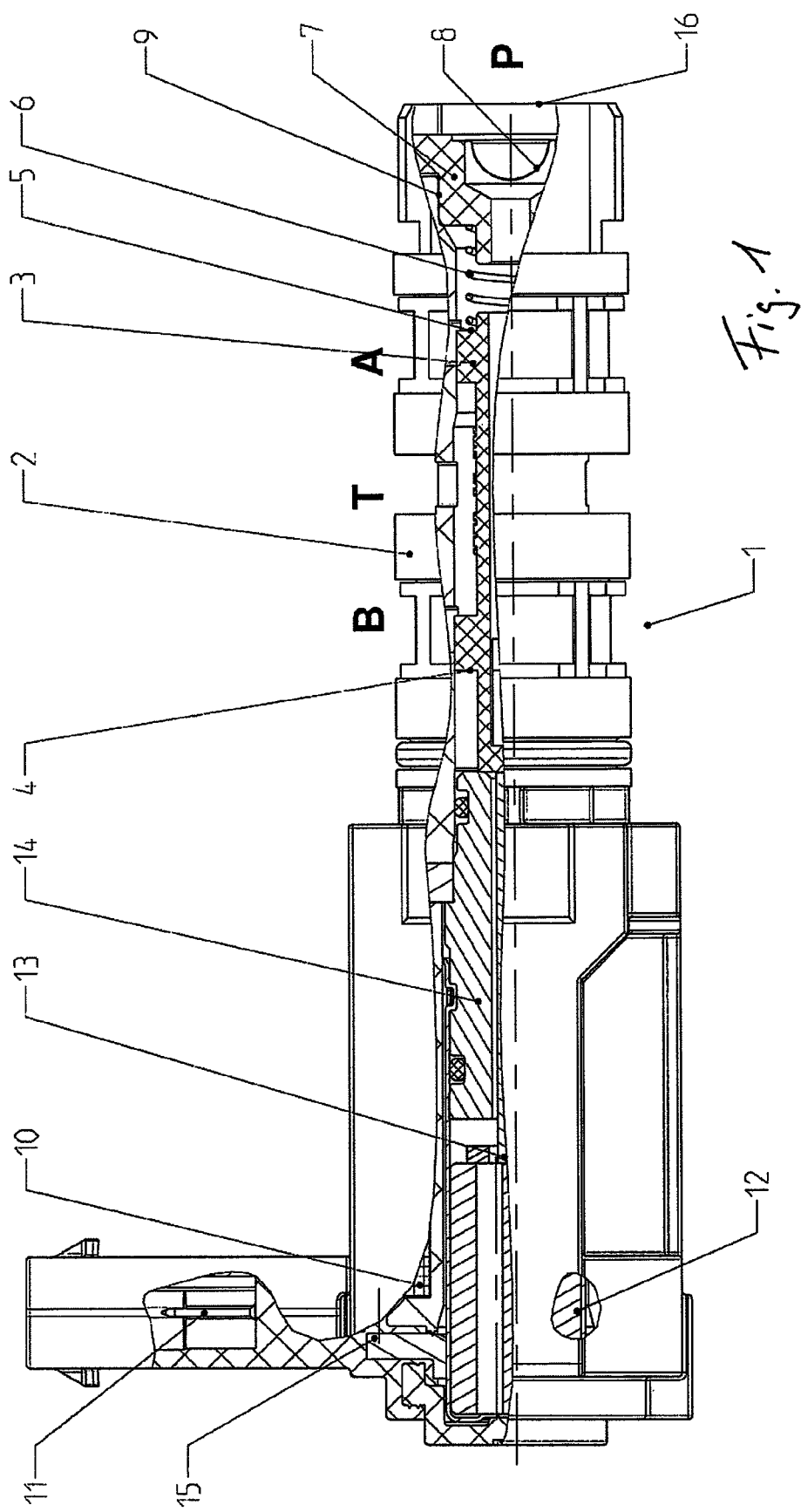

PROPORTIONAL SPOOL VALVE FOR ADJUSTING THE DISPLACED VOLUME OF A DISPLACEMENT PUMP, ASSEMBLY METHOD AND SYSTEM

BACKGROUND OF THE INVENTION

The invention relates to a proportional spool valve for adjusting a displaced volume flow of a displacement pump, in particular of an oil pump in a motor vehicle, the proportional spool valve comprising a valve housing and a valve spool which is mounted in the valve housing and displaceable along a displacement axis and which can be displaced against the spring force of a valve spring axially supported on a spring holder which is fixed relative to the valve housing by energizing an electrical coil assembly (displacement device).

Additionally, the invention relates to an assembly method for such a proportional spool valve and to a system, in particular an oil pumping system in a motor vehicle, comprising a displacement pump, in particular an impeller pump or a vane pump, and a proportional spool valve according to the invention which is configured and disposed to adjust the displaced volume of the displacement pump.

Displacement pumps displace fluids at a volume flow which is proportional to the pump speed. The volume displaced per revolution or per reciprocating stroke (specific volume flow) is constant. The constancy per revolution or per stroke and therefore the proportionality to the pump speed is disadvantageous in oil circuits of motor vehicles in which the component to be supplied by the respective pump, in particular a combustion engine, has a fluid demand (oil demand) in one or several speed range(s) of the displacement pump that is lower than the volume flow resulting from the proportionality. This problem was solved by means of displacement pumps having an adjustable displaced volume flow as described, for example, in U.S. Pat. No. 6,126,420 A.

DE 10 2007 033 146 A1 describes an oil pumping system in a motor vehicle comprising a displacement pump whose displaced volume is adjustable and a proportional spool valve for varying said displaced volume.

The adjusting valves known for this purpose are actuated proportionally, in particular by PWM, and comprise a valve spool which can be displaced in a valve housing against the spring force of a valve spring. Said valve spring is axially supported on the valve spool at one end and, at the other end, on an aluminum spring holder which is pressed into the valve housing or attached by caulking. The assembly of the spring holder according to the state of the art can lead to mechanical deformations and desired forces on the valve housing and/or on the valve spool, thus having a negative impact on functionality.

SUMMARY OF THE INVENTION

Starting from the aforementioned state of the art, the object of the invention is to indicate an improved proportional spool valve for adjusting a displaced volume flow of a displacement pump, in particular of an impeller pump or a vane pump, the proportional spool valve being characterized by an assembly which requires as little physical effort as possible or which does not have a negative impact on the fitting accuracy and being characterized by a good adjustment of an operating point and/or a good compensation of tolerances during the assembly.

Furthermore, the object is to indicate an accordingly improved assembly method for such a proportional spool valve and a displacement pump system, in particular an oil pumping system in a motor vehicle, comprising an accordingly improved proportional spool valve for adjusting the displaced volume of the displacement pump.

Concerning the proportional spool valve, said object is attained by the features disclosed herein, i.e., in a proportional spool valve by the fact that both the in particular single-piece spring holder (in particular a plastic injection-molded part) and the valve housing (in particular a plastic injection-molded part) are made of plastic and that the spring holder is welded to the valve housing to form an integral welded connection.

There are different possibilities with respect to the specific embodiment of the proportional spool valve according to the invention as a multiway valve—said possibilities depend in particular on the design of the displacement pump. If the displacement pump has two pressure chambers which can be supplied via the proportional spool valve and which act on an actuator of the displacement pump for adjusting the volume flow in the manner of a double-acting cylinder, a design of the proportional spool valve as a 4/3-way valve is preferred. If the displacement pump has only one pressure chamber which interacts with the actuator in the manner of a single-acting cylinder, the proportional spool valve can be alternatively designed, for example, as a 3/2-way valve.

Concerning the assembly method, the object is attained by the features disclosed herein and, concerning the system, the object is also attained by the features disclosed herein.

Advantageous embodiments of the invention are disclosed herein and in the dependent claims. All combinations of at least two features disclosed in the description, the claims and/or the figures constitute part of the scope of the invention.

In order to avoid repetitions, disclosed features relating to the device are also seen as relating to the method and are thus also claimable therefor. In the same manner, disclosed features relating to the method are also seen as relating to the device and are thus also claimable therefor.

The idea of the invention with respect to a proportional spool valve for adjusting a displaced volume flow of a displacement pump is to form, contrary to past practice, both the spring holder for axial support of the valve spring and the valve housing accommodating the valve spool and the valve spring of plastic and to permanently fix the spring holder and the valve housing to one another by forming an integral welded connection. In contrast to the connection of aluminum components as used in the state of the art, usually via an interference fit and a mechanical deformation of the aluminum, there is a low force application for the fixation of the spring holder at the valve housing according to the invention by realizing an integral welded connection, negative impacts on the tolerances or the function of the volume flow adjustment valve thus being reliably avoided. In particular, the welded connection according to the invention does not lead to a negative impact on the fit between the valve spool and the valve housing surrounding said valve spool. Furthermore, the design according to the invention and the assembly method according to the invention for assembling the proportional spool valve for the adjustment of the volume flow provide an optimized adjustment option of the spring bias during assembly, in particular in order to allow for an operating point, which is to be explained later, for a self-regulation of the displaced volume flow if the electrical coil assembly or the electromagnetic displacement device fails and/or in order to compensate for production tolerances of the magnetic circuit and/or for dimensional tolerances of the interacting components, in particular when the aforementioned self-regulation is omitted, in order to ensure that predefined or identical actuation of series proportional spool valve results in identical valve or actuating performance of the spool.

There are different possibilities for realizing the integral welded connection. The connection of the spring holder and the valve housing by means of ultrasonic welding is particularly preferred. Additionally or alternatively, it is also possible to realize a laser welding process or a laser welded connection, for example.

There are also different possibilities as to where the integral welded connection can be disposed or positioned.

According to a first embodiment, the spring holder and the valve housing can preferably overlap in the radial direction with respect to the displacement axis of the valve spool, in particular by the spring holder having at least one spool section (radial section) which projects outwards in the radial direction, in particular beyond an inner cylinder section, preferably a hollow cylinder section, and which is located opposite a valve housing section in the circumferential direction, said valve housing section projecting in particular outwards in the radial direction, preferably beyond an, in particular hollow cylindrical, inner housing section, the integral welded connection thus being realized in a circumferential direction between the spool section and the valve housing section. In this regard, the spool section is preferably a single-piece or monolithic component of the plastic spring holder, which is preferably a single piece (monolithic), i.e. produced from the same mold. By analogy, the same applies to the valve housing section to which the spool section is welded—said valve housing section is also preferably formed in a single piece, i.e. monolithically, with the plastic valve housing. In general, the above-described embodiment, which comprises at least one spool section which projects outwards in the radial direction and at least one associated valve housing section opposite said spool section in the circumferential direction, allows for welding in the form of full penetration welding in which the valve housing section and/or the spool section is full-penetration-welded into the section opposite in the circumferential direction; in other words, a welding probe, in particular an ultrasonic welding probe, particularly preferably a multi-pen probe is passed through the section, causing plastic material to melt and be displaced into the section opposite in the circumferential direction (spool section or valve housing section) to form the integral welded connection.

As will be described below, it is also possible, in addition or as an alternative to the realization of an integral welded connection effective in the circumferential direction between a spool section of the spring holder and a valve housing section of the valve housing, in particular projecting outwards in the radial direction, to weld the spring holder and the valve housing to one another at circumferential contact surfaces opposite in the radial direction, in particular in such a manner that an outer circumferential surface of the spring holder extending in a circumferential direction is welded to an in particular matching inner circumferential surface of the valve housing facing inwards in the radial direction and extending in a circumferential direction. In such an embodiment, radial overlapping of the spring holder and the valve housing is particularly preferably dispensed with. The radially opposite circumferential contact surfaces are preferably welded to each other by penetrating the (outer) housing section inwards in the radial direction by means of a welding probe, in particular an ultrasonic welding probe, particularly preferably a multi-pen probe, to melt the plastic material of the valve housing and displace it into the spring holder, thereby forming an integral welded connection.

There are also different possibilities with respect to the first mentioned possibility to realize a welded connection between at least one spool section of the spring holder and a valve housing section of the valve housing, in particular projecting outwards in the radial direction. In a particularly preferred embodiment, during the assembly, the spool section is insertable between two valve housing sections, which are spaced in the circumferential direction, in the axial direction and is integrally welded to at least one of the two valve housing sections, in particular to both valve housing sections within the scope of the method according to the invention. In this regard, the valve housing sections can preferably be formed as ridges which project outwards in the radial direction, in particular beyond an inner valve housing section, and which sandwich the spool section between them in the circumferential direction. An embodiment comprising at least one spool section accommodated between two valve housing sections, in particular in the form of ridges, allows for a particularly preferred realization in which full penetration welding is realized in such a manner that the spool section and at least one valve housing section integrally engage with one another in the circumferential direction; said engagement can be realized, for example, by piercing the radially projecting valve housing section with a welding probe, preferably an ultrasonic welding probe, in the circumferential direction, the probe thus penetrating the spool section and partially melting both components and the melt of the two plastic components thus forming a positive connection. In this regard, it is possible that the welded connection is realized exclusively between one of the valve housing sections and the spool section or that the welded connection penetrates the spool section, the spool section thus being integrally welded to one of the valve housing sections at both circumferential sides. It is also conceivable to pierce both valve housing sections in opposite circumferential directions with a welding probe, in particular one welding probe each, as far as into the spool section which is disposed between them, i.e. to realize the welded connections at both sides of the spool section from two sides.

According to an alternative embodiment, the spool section is located opposite, in the circumferential direction, one valve housing section only, which is in particular in the form of a ridge and which projects outwards in the radial direction and which is integrally connected to the spool section, in particular by welding. Within the scope of the method, force is preferably applied to the spool section from the circumferential side facing away from the valve housing section towards the valve housing section by means of an anvil, while a welding probe, preferably an ultrasonic welding probe, is passing through or fully penetrating the valve housing section in the circumferential direction, i.e. towards the anvil, as far as into the spool section, the valve housing section thus being connected to the spool section.

The embodiment which comprises only one valve housing section projecting outwards in the radial direction in the form of a ridge and assigned to the specific spool section ensures more freedom for producing the welded connection due to the aforementioned possible application of (counter-) pressure in the circumferential direction.

Irrespective of whether a radially projecting spool section is welded to a radially projecting valve housing section at two circumferential sides or at one circumferential side only, it is possible to realize said welding over the entire surface or only selectively, in particular at weld spots which are distributed over the contact surfaces and which are defined or predetermined by a corresponding circumferentially projecting surface structure of the spool section and/or of the corresponding valve housing section.

The aforementioned embodiments comprising a spool section can generally be realized having a single radially projecting spool section of the spring holder to which, depending on the specific embodiment, only one valve housing section radially projecting from the valve housing or, alternatively, two valve housing sections located opposite each other in the circumferential direction is or are assigned. A preferred embodiment comprises several, in particular two, particularly preferably exactly two spool sections spaced, preferably equally, in the circumferential direction and, in particular, diametrically opposed, to which a single valve housing section or alternatively two valve housing sections spaced in the circumferential direction is or are assigned in order to realize respective integral welded connections.

As already mentioned, it is also possible to realize an integral welded connection effective in the radial direction between the spring holder and the valve housing in addition or as an alternative to the integral welded connection pointing in the circumferential direction. If an ultrasonic connection is realized, a welding probe, in particular an ultrasonic probe, is preferably passed through the valve housing radially from the outside to the inside so that a radial full-penetration weld is realized. As already mentioned, the embodiment comprising said welding effective in the radial direction can generally be realized in addition to the welding by means of a radial spool section—but in a preferred case, a radial overlapping of the spring holder and the valve housing is dispensed with when realizing the welding effective in the radial direction.

In a particularly preferred embodiment, an axial stop at the valve housing is assigned to the spring holder in order to limit an axial sliding insertion movement of the spring holder into the valve housing during assembly. In the aforementioned embodiment comprising a radially projecting spool section, said spool section preferably forms the counter-stop in cooperation with the axial stop of the valve housing.

In a particularly preferred embodiment of the proportional spool valve, said proportional spool valve has a preferably axial pressure connection which communicates with an axial through-flow channel which intersperses the at least partially hollow cylindrical spring holder in the axial direction; in other words, the spring holder is preferably configured as a sleeve and has an in particular central through-flow channel through which the fluid, in particular oil, can flow from the pressure connection of the valve towards the valve spool. Depending on the position of the valve spool, the fluid can flow via the through-flow channel along the displacement axis to at least one working connection and/or to a tank connection, which is/are preferably disposed at the wall of the valve housing.

Notwithstanding the above, an embodiment of the proportional spool valve is possible and preferred which, by analogy with the embodiment described in DE 10 2007 033 146 A1, has a specific valve spool which is characterized in that it has effective surfaces for a displacement pressure of the displaced fluid, in particular oil, which are opposed to one another and which differ in size to create a differential force which acts on the valve spool of the valve spring according to the size difference of the effective surfaces. In this way, a self-regulating system can be created in a manner known per se, in which the displaced volume flow, in particular the oil volume flow of the displacement pump regulates itself in a specific displaced volume range.

In such an embodiment, in particular, the assembly of the proportional spool valve according to the invention depends on an accurate adjustment of the operating point during assembly, for which purpose the axial position of the spring holder is individually set or adjusted during the assembly before the spring holder is then welded to the valve housing according to the invention.

The invention also relates to an assembly method for the above-described proportional spool valve according to the invention, the spring holder and the valve housing and a valve spring being provided and the valve spring and the spring holder being inserted into the valve housing and the spring holder then being fixed to the valve housing. According to the invention, said fixation is realized by welding the spring holder made of plastic to the valve housing made of plastic, in particular by ultrasonic welding or laser welding, an integral welded connection being formed. With respect to the different possibilities to realize the welded connection, reference is made to the aforementioned explanations.

In a particularly preferred case, the spring bias of the valve spring is adjusted, as already mentioned, by individually adjusting the axial position of the spring holder before the welding and the welded connection is realized afterwards.

Furthermore, the invention relates to a system, in particular an oil pumping system in a motor vehicle, comprising a displacement pump such as an impeller pump having at least one or, alternatively, two pressure chambers acting opposed to one another to displace an actuator to adjust the displaced volume of the displacement pump. Furthermore, the system comprises a proportional spool valve formed according to the invention which communicates preferably with the at least one pressure chamber to displace the actuator of the displacement pump by pressurizing or depressurizing at least one pressure chamber, thereby adjusting, in particular controlling the displaced volume of the displacement pump.

BRIEF DESCRIPTION OF THE DRAWINGS

Further advantages, features and details of the invention can be derived from the following description of preferred exemplary embodiments and from the drawings.

In the following,

FIG. 1 is a longitudinal sectional view of a preferred exemplary embodiment of a proportional spool valve formed according to the idea of the invention for adjusting a displaced volume of a displacement pump.

In the figures, the same elements and elements having the same function are referenced with the same reference numerals.

DETAILED DESCRIPTION

Figure 2A:
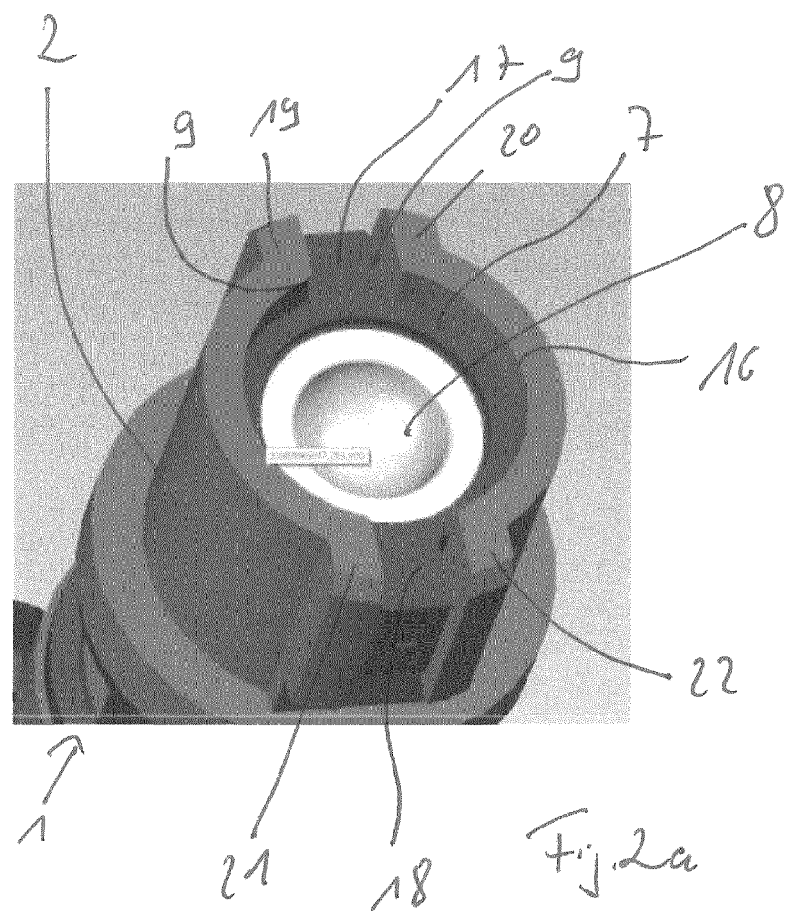
FIG. 2a is a detailed view of a possible embodiment of the proportional spool valve according to FIG. 1, a welded connection effective in the circumferential direction being realized between two diametrically opposed spool sections and two radially projecting housing sections in the form of ridges opposed in the circumferential direction.

In FIG. 1, an exemplary embodiment of a proportional spool valve 1 formed according to the idea of the invention for adjusting a displaced volume—an oil volume in the case at hand—of a displacement pump such as a vane pump (not shown) is illustrated.

Proportional spool valve 1 comprises a valve housing 2 made from plastic in which a valve spool 3 is mounted so as to be displaceable along a displacement axis V.

In the case at hand, proportional spool valve 1 is configured as a 4/3-way valve and comprises an axial pressure connection P at the end face which is connected to the pressure side of an oil circuit comprising a displacement pump within the scope of the system. In valve housing 2, proportional spool valve 1 also comprises a tank connection T at the wall, which is connected to a low pressure side of the oil circuit or to an oil reservoir. Furthermore, proportional spool valve 1 comprises two working connections A, B which can be connected, preferably alternately, to the pressure connection P and the tank connection T by displacing valve spool 3 in order for two pressure chambers of the displacement pump to be supplied with oil pressure or to be connected to the low pressure side to adjust the displaced volume, thereby causing an adjustment of an actuator of the displacement pump and manipulating the displaced volume. Proportional spool valve 1 can alternatively be realized as a 3/2-way valve having a single working connection if instead of two pressure chambers acting against one another being provided in the displacement pump, the actuator can be adjusted against the spring force of a return spring by means of a single pressure chamber.

In the case at hand, valve spool 3 comprises a first and a second displacement-effective (axial) surface 4, 5, first effective surface 4 being larger than second effective surface 5, a fluid force component thus acting along displacement axis V against the spring force of a valve spring 6 which is axially supported by valve spool 3 at one end and, at the other end, by a spring holder 7 made from plastic which is disposed directly downstream of pressure connection P and which has a through-flow channel 8 to direct the fluid, oil in the case at hand, towards valve spool 3, i.e. towards working connections A, B. According to the invention, spring holder 7 is welded to valve housing 2 by means of an integral welded connection 9.

To displace valve spool 3 between the different adjustment or axial positions, the proportional spool valve comprises a preferably PWM-actuated coil assembly 10 which can be actuated via an electrical contact connection 11. By energizing coil assembly 10, an armature 12 surrounded in sections by coil assembly 10 is displaced against a plunger 13 to the right in the drawing plane, said plunger 13 interspersing a magnetic core 14 towards valve spool 3 in order to adjust valve spool 3. A yoke 15 spaced from core 14 is assigned to armature 12 for closing the magnetic circuit.

For the assembly of proportional spool valve 1, valve spool 3, valve spring 6 and spring holder 7 are inserted into valve housing 2 through an end-face or axial insertion opening 16 at the right side of the drawing plane. Spring holder 7 is axially displaced by measuring the pressure ratios at at least one of connections A, B, T when coil assembly 10 is energized and a pressure at the pressure seal is known until the desired target pressure is reached at the corresponding connection, whereupon the integral welded connection 9 is formed. In this regard, there are also different possibilities.

Figure 2B:
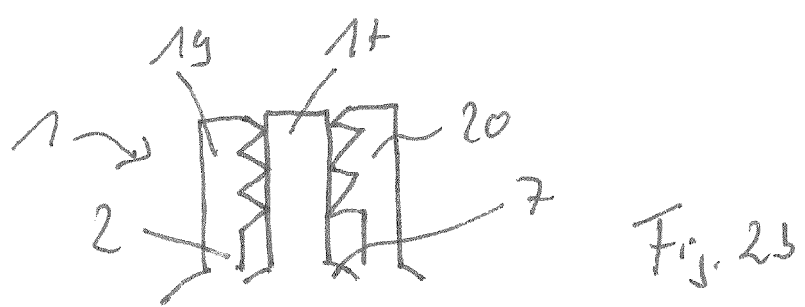
FIG. 2b is a version of the exemplary embodiment according to FIG. 2a for realizing selective welded connections.

In an exemplary embodiment shown in FIG. 2, which shows a diagonal view of insertion opening 16, spring holder 7 comprises two diametrically opposed spool sections 17, 18 which are axially displaced along displacement axis V relative to valve housing 2. Each spool section 17, 18 is formed in a single piece with the remaining spring holder 7, which is a radially inner hollow cylinder in the case at hand. In the circumferential direction, spool sections 17, 18 are each accommodated between two valve housing sections 19, 20, 21, 22 which are spaced in the circumferential direction and which are formed as ridges projecting radially outwards beyond a hollow cylindrical section of the valve housing which accommodates spring holder 7. Depending on the embodiment or realization of the welding method, it is possible to weld each of the spool sections 17,18 to only one of the assigned valve housing sections 19, 20, 21, 22 or to both valve housing sections 19, 20, 21, 22, in particular by full penetration welding, which comprises inserting a welding probe, preferably a multi-pen ultrasonic probe, in the circumferential direction through a valve housing section 19, 20, 21, 22 as far as into the associated spool section 17, 18, preferably beyond said spool section and into the opposite valve housing section 19, 20, 21, 22. If the opposite surfaces of spool sections 17, 18 and valve housing sections 19, 20, 21, 22 are unstructured, a welded connection 9 is realized substantially across the entire surface. Alternatively, an exemplary embodiment shown in FIG. 2b can be realized, in which spool section 17 and valve housing section 20 do not contact one another over the entire surface; instead, the surface structure is such that selective and preferably spaced welded connections 9 result.

The exemplary embodiments shown in FIGS. 2a and 2b are characterized in that valve housing 2 and spring holder 7 overlap in the radial direction and that welded connection 9 is realized at contact surfaces opposing each other in the circumferential direction.

Figure 3A:
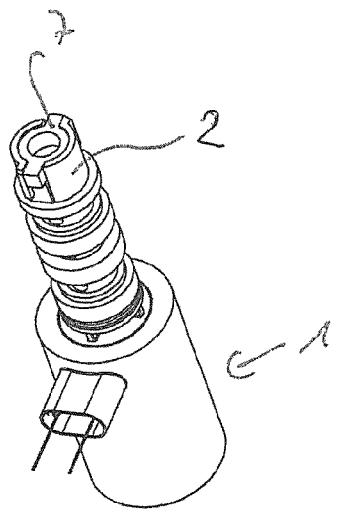
FIG. 3a and FIG. 3b are different views of an alternative embodiment of a proportional spool valve formed according to the idea of the invention, the spool sections being welded to a radially projecting housing section in the form of a ridge, the welded connection being effective in the circumferential direction at one side only.
Figure 3B:
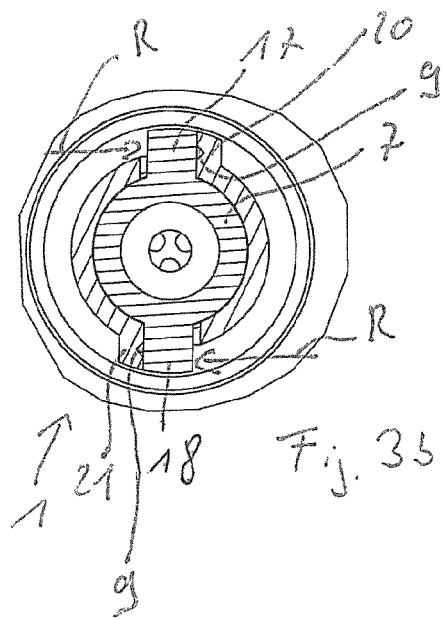

FIGS. 3a and 3b show an additional alternative embodiment comprising a spring holder 7 and a valve housing 2 overlapping in the radial direction. By analogy with the exemplary embodiment according to FIGS. 2a and 2b, spring holder 7 is provided with two spool sections 17, 18 which are diametrically disposed and which extend or project in opposite radial directions; however, only one valve housing section 20, 21 in the form of a ridge and projecting radially outwards beyond an essentially hollow cylindrical valve housing section is assigned to each spool section 17, 18, a welded connection thus being realized at one side only. During welding, force is applied to each of the spool sections 17, 18 in the direction of arrow R by means of an anvil (not shown) and spool sections 17, 18 are pressed against a contact surface of the associated valve housing section 20, 21 located opposite in the circumferential direction to improve the formation of welded connection 9. If an ultrasonic welding method is realized, the welding is preferably realized in such a manner that valve housing sections 20, 21 are each penetrated with a welding probe, in particular a multi-pen ultrasonic probe, from the circumferential side facing away from the anvil as far as into the associated spool section 17, 18 and that the integral welded connection is thus realized.

Figure 4A:
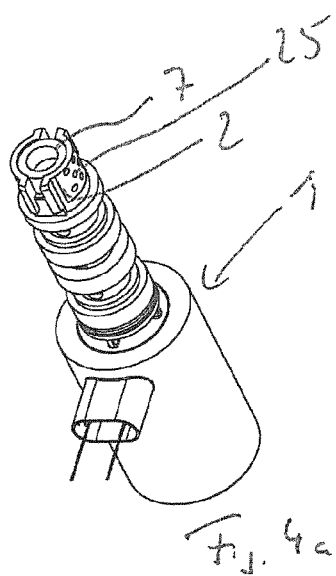
FIG. 4a and FIG. 4b are different views of an additional alternative embodiment of a proportional spool valve formed according to the idea of the invention, a welded connection effective exclusively in the radial direction being realized between the spring holder and the valve housing.
Figure 4B:
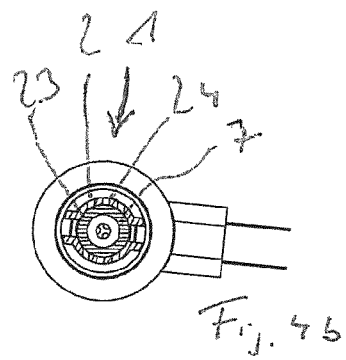

The exemplary embodiment according to FIGS. 4a and 4b to be described below can be realized in addition or as alternative to the aforementioned embodiments or welded connections 9. In contrast to the above-described embodiments, spring holder 7 has no radially projecting spool sections 17, 18; however, they can be realized, if required. In the case at hand, the welding is realized in the radial direction or, more precisely, between two circumferential contact surfaces opposite in the radial direction at outer circumference 23 of spring holder 7 on the one hand and, on the other hand, at opposite radially inner circumference 24 of valve housing 2 which extends in the circumferential direction like outer circumference 23. In FIG. 4a, penetration points 25 can be seen which are caused by a multi-pen ultrasonic probe by means of which valve housing 2 has been penetrated in the radial direction as far as into spring holder 7 to form integral welded connection 9.

REFERENCE SIGNS 1 proportional spool valve
2 valve housing
3 valve spool
4 first effective surface
5 second effective surface
6 valve spring
7 spring holder
8 through-flow channel
9 integral welded connection
10 coil assembly
11 contact connection
12 armature
13 plunger
14 core
15 yoke
16 insertion opening in the valve housing
17 spool section
18 spool section
19 valve housing section
20 valve housing section
21 valve housing section
22 valve housing section
23 outer circumference of the spring holder
24 inner circumference of the valve housing
25 penetration points
A working connection
B working connection
P pressure connection
R arrow direction(s)
T tank connection
V displacement axis

The invention claimed is:

1. A proportional spool valve (1) for adjusting a displaced volume of a displacement pump, the proportional spool valve (1) comprising a valve housing (2) and a valve spool (3) which is mounted in the valve housing (2) and displaceable along a displacement axis (V) and which can be displaced against the spring force of a valve spring (6) axially supported on a spring holder (7) which is fixed relative to the valve housing (2) by energizing an electrical coil assembly (10), wherein
  both the spring holder (7) and the valve housing (2) are made of plastic and the spring holder (7) is welded to the valve housing (2), an integral welded connection (9) being formed wherein the spring holder (7) has at least one spool section (17, 18) which extends outwards in the radial direction and which, in a circumferential direction, is welded to at least one associated valve housing section (19, 20, 21, 22) opposite said spool section (17, 18) in the circumferential direction, wherein said at least one valve housing section (19, 20, 21, 22) is projecting outwards in the radial direction in the form of a ridge.

2. The proportional spool valve according to claim 1, wherein the spring holder (7) and the valve housing (2) overlap in the radial direction.

3. The proportional spool valve according to claim 1, wherein the spool section (17, 18) is sandwiched between two valve housing sections (19, 20, 21, 22) which are spaced in the circumferential direction, and are welded to both of the two valve housing sections (19, 20, 21, 22) by full penetration welding in the circumferential direction, or wherein the spool section (17, 18) is welded to the valve housing section (19, 20, 21, 22) to a ridge projecting outwards in the radial direction, exclusively in the circumferential direction.

4. The proportional spool valve according to claim 1, wherein the at least one spool section (17, 18) and the valve housing section (19, 20, 21, 22) are welded to one another over an entire surface or at spaced weld spots which are defined by a surface structure of the at least one spool section (17, 18) and/or of the valve housing (2).

5. The proportional spool valve according to claim 1, wherein the spring holder (7) has at least two, spool sections (17, 18) which are each welded to at least one valve housing section (19, 20, 21, 22).

6. The proportional spool valve according to claim 1, wherein the spring holder (7) and the valve housing (2) are exclusively welded to one another at radially opposed circumferential contact surfaces.

7. The proportional spool valve according to claim 1, further comprising an axial stop on one of the valve housing (2) or the spring holder (7) in order to limit axial sliding insertion movement of the spring holder (7) into the valve housing (2) during assembly.

8. The proportional spool valve according to claim 1, wherein the spring holder (7) limits an axial through-flow channel (8) which communicates with a pressure connection (P) of the proportional spool valve (1) and/or wherein the valve spool (3) has surfaces (4, 5) for a displacement pressure of a displaced fluid, which are opposed to one another and which differ in size to create a differential force which counteracts on the valve spool (3) of the valve spring (6) according to a size difference of the surfaces (4, 5).

9. A method for assembling the proportional spool valve (1) according to claim 1, comprising the steps:
  providing the spring holder (7) and the valve housing (2) and the valve spring (6)
  inserting the valve spring (6) and the spring holder (7) into the valve housing (2)
  fixing the spring holder (7) to the valve housing (2), wherein
  the spring holder (7) made of plastic and the valve housing (2) made of plastic are fixed to one another by welding, an integral welded connection (9) being formed.

10. The method according to claim 9, wherein spring bias of the valve spring (6) is adjusted by axially moving the spring holder (7) and the valve housing (2) relative to each other before welding.

11. The method according to claim 9, wherein the spring holder (7) has at least one spool section (17, 18) which extends outwards in the radial direction and which, in the circumferential direction, is welded to the valve housing section (19, 20, 21, 22).

12. The method according to claim 11, wherein the spool section (17, 18) is sandwiched between two valve housing sections (19, 20, 21, 22) spaced in the circumferential direction, and said spool section is welded to both of the two valve housing sections (19, 20, 21, 22), by full penetration welding of at least one of the two valve housing sections (19, 20, 21, 22) in the circumferential direction.

13. The method according to claim 11, wherein the spool section (17, 18) is welded, exclusively in the circumferential direction, to the valve housing section (19, 20, 21, 22), under simultaneous application of contact pressure to the spool section (17, 18) in the circumferential direction by means of an anvil, against the valve housing section (19, 20, 21, 22) from a side of the spool section (17, 18) facing away from the valve housing section (19, 20, 21, 22).

14. The method according to claim 9, wherein the spring holder (7) and the valve housing section (19, 20, 21, 22) are welded to one another exclusively at circumferential contact surfaces opposing each other in the radial direction.

15. An oil pumping system in a motor vehicle, comprising a displacement pump which has an adjustable displaced volume impeller pump and a proportional spool valve (1) according to claim 1, the system being configured and disposed to adjust the displaced volume of the displacement pump.

16. The proportional spool valve according to claim 3, wherein the two valve housing sections are ridges projecting outwards in the radial direction.

17. The method according to claim 9, wherein the valve housing section is a ridge projecting outwards in the radial direction.

18. The method according to claim 12, wherein the two valve housing sections are two ridges projecting outwards in the radial direction.

19. The proportional spool valve according to claim 1, wherein the displacement pump is an oil pump of a motor vehicle.

\* \* \* \* \*